United States Patent [19]

Klausing et al.

[11] Patent Number: 5,777,573
[45] Date of Patent: Jul. 7, 1998

[54] DEVICE FOR MOTION ERROR COMPENSATION FOR A RADAR WITH SYNTHETIC APERTURE BASED ON ROTATING ANTENNAS (ROSAR) FOR HELICOPTERS

[75] Inventors: Helmut Klausing, Wessling/Hochstadt; Aribert Wolframm, Landsberg, both of Germany

[73] Assignee: Daimler-Benz Aerospace AG, Ottobrunn, Germany

[21] Appl. No.: 691,715

[22] Filed: Aug. 2, 1996

[30] Foreign Application Priority Data

Aug. 4, 1995 [DE] Germany .................. 195 28 613.8

[51] Int. Cl.$^6$ ................................................ G01S 13/90
[52] U.S. Cl. .................................................. 342/25
[58] Field of Search ............................ 342/25, 165, 174, 342/189, 145, 195, 179, 29, 191

[56] References Cited

U.S. PATENT DOCUMENTS 4,737,788  4/1988  Kennedy .................................. 342/29
5,379,041  1/1995  Klausing ................................. 342/25
5,381,152  1/1995  Klausing ................................. 342/25
5,392,047  2/1995  Klausing ................................. 342/25
5,451,957  9/1995  Klausing ................................. 342/25
5,614,907  3/1997  Kreitmair-Streck et al. ............ 342/25

FOREIGN PATENT DOCUMENTS 39 22 086 C1  10/1990  Germany .

OTHER PUBLICATIONS

Dipl. –Ing. Helmut Kluasing, Apr. 21, 1989, Feasibility of a Radar with Synthetic Aperture by Rotating Antennas, MBB *Publikation*, MBB–UA–1150–89=OTN=029299, 1989.

*Primary Examiner*—Daniel T. Pihulic
*Attorney, Agent, or Firm*—McGlew and Tuttle

[57] ABSTRACT

The present invention pertains to a device for motion compensation for a radar with synthetic aperture based on rotating antennas (ROSAR) for helicopters, with which the flight guidance of the helicopter is made possible according to a radar image on a ROSAR basis, because this device substantially improves the quality of this radar image.

9 Claims, 5 Drawing Sheets

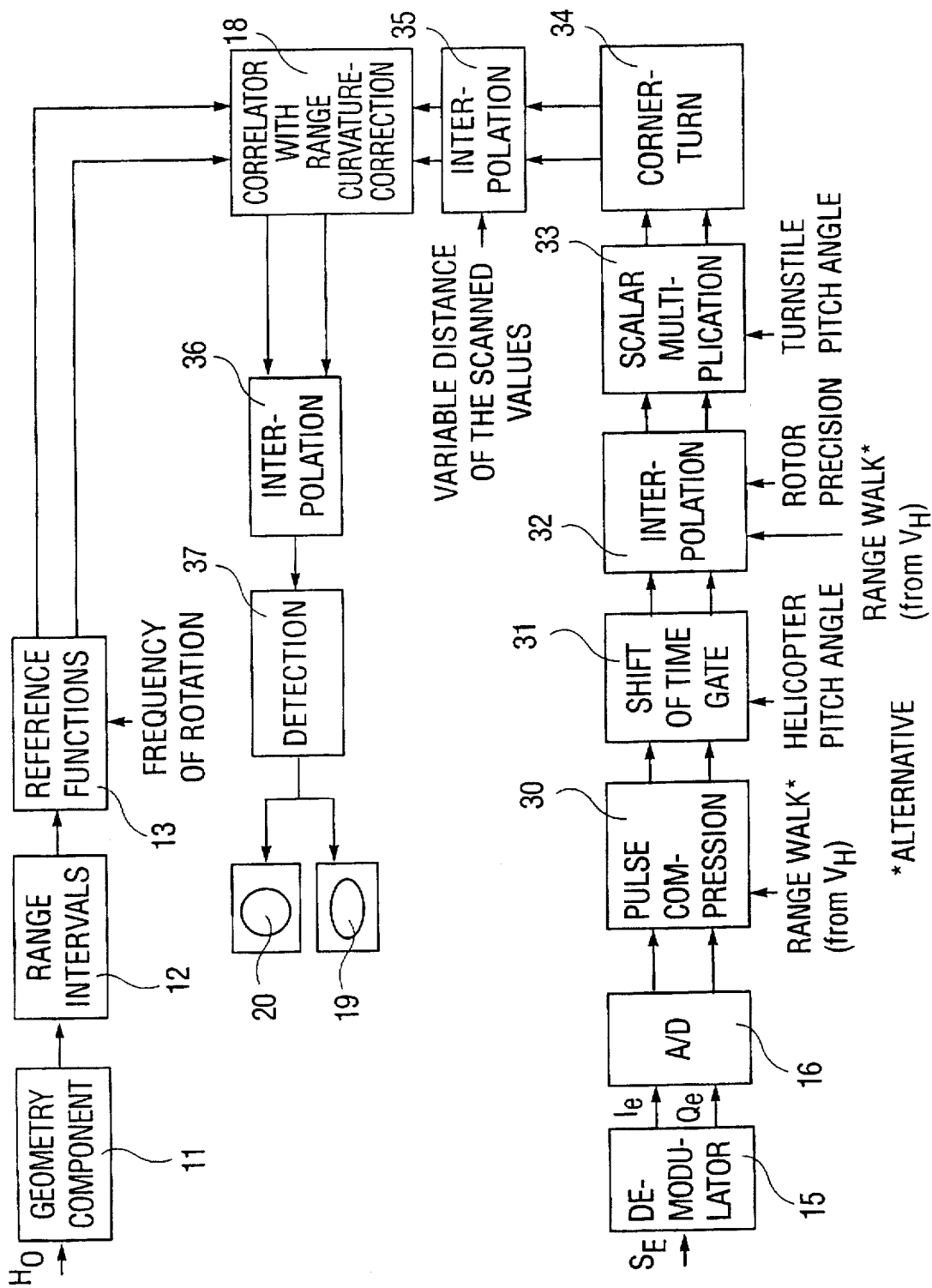

ROLL ANGLE

PITCH ANGLE

DEVICE FOR MOTION ERROR COMPENSATION FOR A RADAR WITH SYNTHETIC APERTURE BASED ON ROTATING ANTENNAS (ROSAR) FOR HELICOPTERS

FIELD OF THE INVENTION

The present invention pertains to a device for motion error compensation for a synthetic aperture radar for a rotating antenna (rosar) of a helicopter and its flight guidance.

BACKGROUND OF THE INVENTION

A radar with a transmitter and a receiver as well as with an antenna for transmitting and receiving radar pulses, in which the antenna is arranged at the end of a rotating arm, e.g., of a helicopter rotor or of a turnstile, above the rotor axis, has been known from DE 39 22 086 and the dissertation "Feasibility of a Radar with Synthetic Aperture by Rotating Antennas" by Dr. Helmut Klausing, Eng., MBB Publikation, MBB UA-1150-89=OTN-029299, 1989. Such a radar with a synthetic aperture based on rotating antennas is often called a ROSAR device. The received signals are demodulated, buffered, and subsequently correlated with reference functions. These reference functions are calculated or preset as a function of the illumination geometry of the radar. The parameters for this calculation or for the preset value are the range intervals, the transmission frequency, the location of the rotating rotary arm, the range of rotation angles of the antenna from which returned signals are received, as well as the number of transmitted pulses and the altitude of the rotating antenna above ground. The correlation result is then displayed, e.g., on a monitor.

Such a radar can be used almost in real time in on-line operation, and it can thus also be used for reconnoitering and tracking targets, besides mapping, obstacle warning, or as a landing aid. The processor of this prior-art ROSAR device has a plurality of components in order to split up the many diverse and complex calculation tasks and thus to make possible the on-line operation. The result is then obtained for each range interval by the correlation of the received signal with a reference function applicable to this range interval.

However, this ROSAR signal processing assumes an ideal orbit with constant angular velocity. However, the fact that the antenna arm tips perform motions deviating from a regular orbit, and even stochastic motions as a consequence of the aerodynamic conditions, should not be underestimated. These deviations cause additional Doppler modulations of the received signal. However, the reference function is calculated for a two-dimensional rotary motion at constant angular velocity, as a result of which the result of the correlation between the received signal and the reference function is "blurred." The greater the deviation from the ideal orbit, the poorer will be the correlation result and consequently the lateral resolution as well.

SUMMARY AND OBJECTS OF THE INVENTION

The basic object of the present invention is to provide a device of the class described in the introduction, with which the motions of the antenna arm deviating from the ideal orbit are measured during a revolution as a motion error for correction, are entered as real correction signals into the processor, and a substantially improved signal processing and image quality are thus achieved.

This object is accomplished by a transmitting and receiving antenna arranged on a rotating arm of the helicopter. The transmitting antenna transmits successive pulses and the receiving antenna receives these pulses after they have been reflected from distant objects. A correlation means receives the signals with preset reference functions and a correction means corrects for motion and curvature errors. Additional electronic components are included for forming range intervals, demodulation and A/D conversion. A pulse compression component transforms data by using an FFIT. The signals from the pulse compression component are sent for index shifting to another electronic component where a time gate is shifted. The shifting component is associated with an interpolation element for fine shifting of the time gate. A scaler multiplication component compensates for variations in amplitude and the data is then entered into a large memory or Corner Turn component. A second interpolation element, a correlation means with range curvature correction and a third interpolation component compensate for the data shift caused by the tangential velocity component. A detection unit is arranged between the third interpolation component and a memory with a monitor. The detection means converse the complex data into real amplitude data.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic representation of a block diagram of the exemplary embodiment described.

DETAILED DESCRIPTION OF THE PREFERRED EMBODIMENT

Figure 2A:
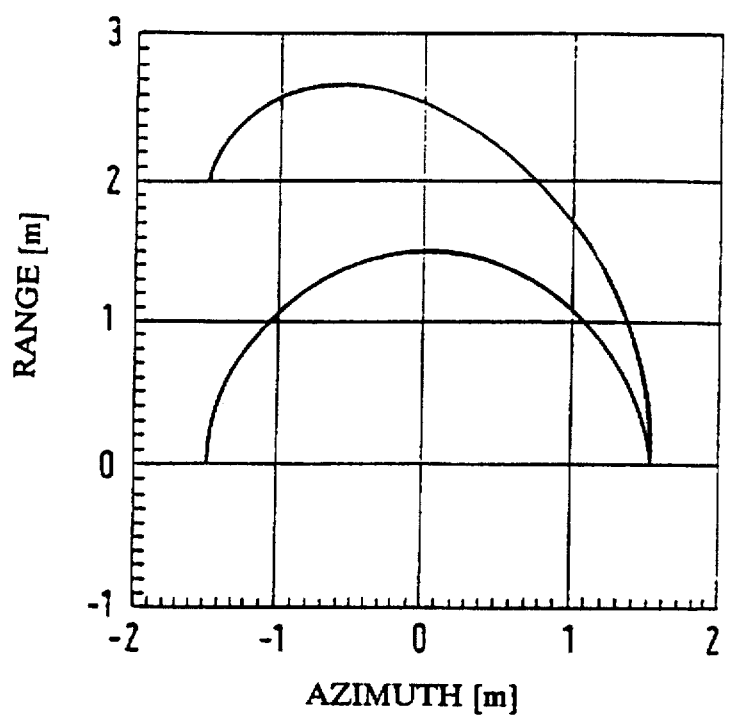
FIG. 2a is a diagram of the projection of the motion of the antenna to the earth's surface during a semicircle without forward motion of the helicopter and at a forward velocity of 50 knots.

To identify and classify phase errors occurring as a consequence of the deviations from the ideal orbit of the revolution of the rotor blade of the helicopter, an exemplary embodiment shown in the drawings and having input parameters shown in the table will be described below.

Input Parameters

| | | | |
|---|---|---|---|
| Frequency of rotation | $f_{Dreh}$ | 6.375 | Hz |
| Angular velocity | $\omega_0$ | 2 π 40.06 | sec$^{-1}$ |
| Length of the antenna arm | L | 1.5 | m |
| Forward velocity of the helicopter | $v_H$ | | |
| - nominal | | 50 | knots |
| Aperture angle of the antenna in the azimuth | γ | 45 | ° |
| Image angle | | 75 | ° |
| Wavelength | λ | 0.006666 | m |

The following derived parameters are obtained from this:

Derived Parameters

| | | | |
|---|---|---|---|
| Integration time | $T_S$ | 19.61 | msec |
| Velocity of the antenna | $v_A$ | 60.08 | msec$^{-1}$ |
| Doppler bandwidth (nominal) | $B_D$ | 13,795.8 | Hz |
| Reference function (nominal) | | 271 | complex support points |

The forward-velocity motion of a helicopter generates the greatest phase errors, which must be compensated. This forward velocity very strongly deforms the circular motion of the antennas into a spiral motion (cycloid) on the earth's surface. The motion equations are stated parametrically; they are:

$$x = L \cdot \cos(\omega_0 t)$$

$$y = L \cdot \sin(\omega_0 t) + v_H \cdot t$$

This motion is shown in FIG. 2a compared with a perfect circular motion of a semicircle. This means, depending on the desired resolution, that circular range rings are distributed on more than one scanning time (resolution cell) during one revolution of the antenna turnstile.

Figure 2B:
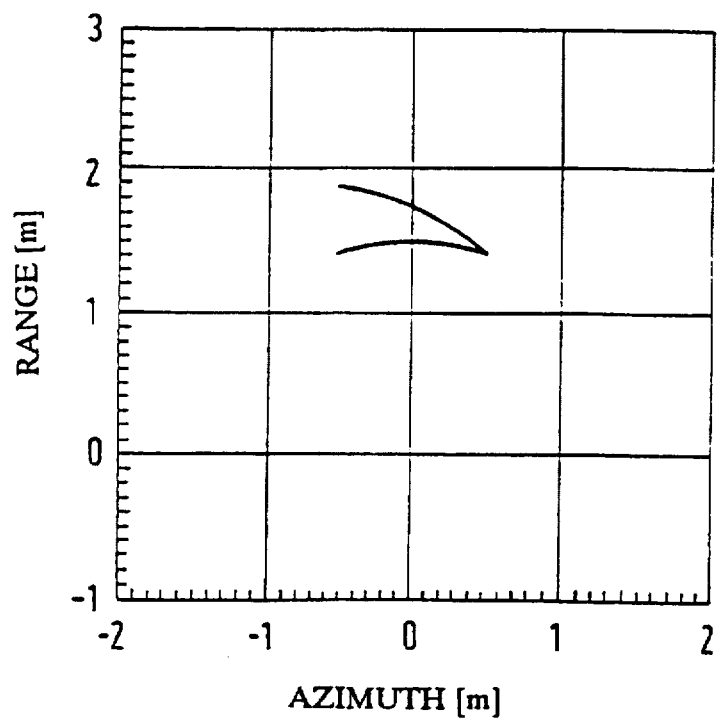
FIG. 2b is a diagram of the projection of the antenna motion to the earth's surface during the integration time without forward motion of the helicopter and at a forward velocity of 50 knots.

FIG. 2b illustrates the deviation during the integration time $T_S$. With the above input parameters, the helicopter is moving forward by about 0.5043 m during the integration time. This corresponds to about 80 wavelengths. It should also be mentioned that these considerations concern the forward-velocity motion of the helicopter only. The effect on the individual range rings depends, of course, on the depression angle. The effect on the individual resolution angle also depends on the azimuthal angle of rotation.

Figure 3A:
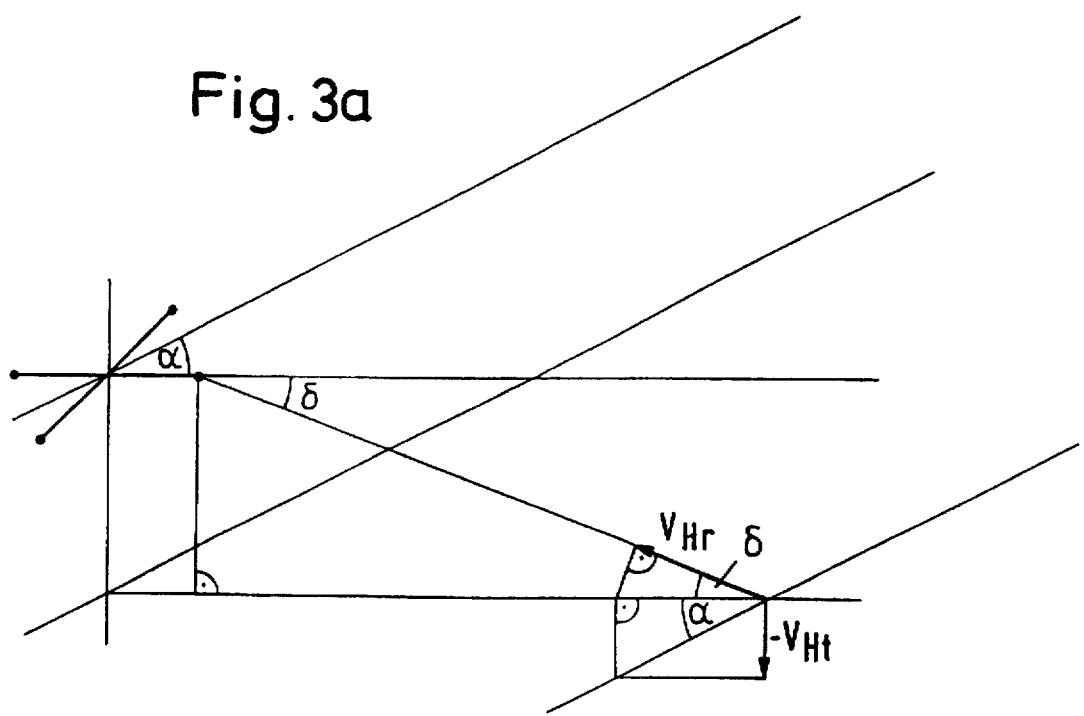
FIG. 3a is a schematic sketch of the three-dimensional splitting of the forward velocity.

The forward motion of the helicopter affects each resolution cell that depends on the depression angle (elevation) and the angle of rotation (azimuth). The situation is shown in FIG. 3a for an arbitrary point on the earth's surface. The forward velocity is split up three-dimensionally into its components in the direction of view of the antenna, and the direction of rotation of the antenna is split up orthogonally thereto. Equivalent to this is the representation of the earth's surface moving relative to the helicopter and of a helicopter stopped relative to the earth's surface. In this equivalent approach, each point on the earth's surface has an individual radial velocity component ($v_{Hr}$) and an individual tangential velocity component ($v_{Ht}$) in relation to the rotating antenna, which depend on the individual depression angle and angle of rotation.

The radial component of the forward velocity (velocity component in the direction of view of the antenna) has effects which can be explained relatively simply. It causes a Doppler shift of the received signal in the receiver:

$$B'_D = 2 \cdot v_{Hr}/\lambda \cdot \cos(\omega_0 \cdot t) \cdot \cos\varepsilon.$$

This Doppler shift has its maximum when the antenna is directed exactly in the direction of flight of the helicopter and leads to a 7,716.7-Hz signal. A Doppler shift of the received signal in the frequency range corresponds to a shift of the location of the image. If a transmission bandwidth of about 150 MHz is assumed in this case, the instantaneous reception bandwidth in an FMCW (Frequency Modulated Continuous Wave) system with Deramp-on-Receive is barely 30 MHz, and the A/D converter rate is at least 60 MHz. At least 600 real scanned values are obtained with a reception gate of 10 μsec, corresponding to 1.5 km in oblique distance. It follows from this that an instantaneous bandwidth of about 50 kHz corresponds to a single scanned value. However, it can thus be recognized that the maximum Doppler shift of 7,716.7 Hz calculated above corresponds to a shift of one sixth of one scanning cell, and it does not necessarily always have to be corrected. This process decreases continuously from the resolution cell located at the greatest distance to the helicopter. No more shift takes place directly under this helicopter, because the radial component equals zero here. Consequently, a hardly perceptible distortion of the image axis occurs here. However, this effect is greater after the correlation, because all points on the ground up to half of one meter may cause a reduction in range resolution unless a shift was previously eliminated by interpolation (motion compensation), because the scanned values used for the correlation have shifted by up to half of one meter during a synthetic aperture. This "blurring" also appears in addition to the theoretical resolution, and it is certainly too great to be tolerated.

Figure 3B:
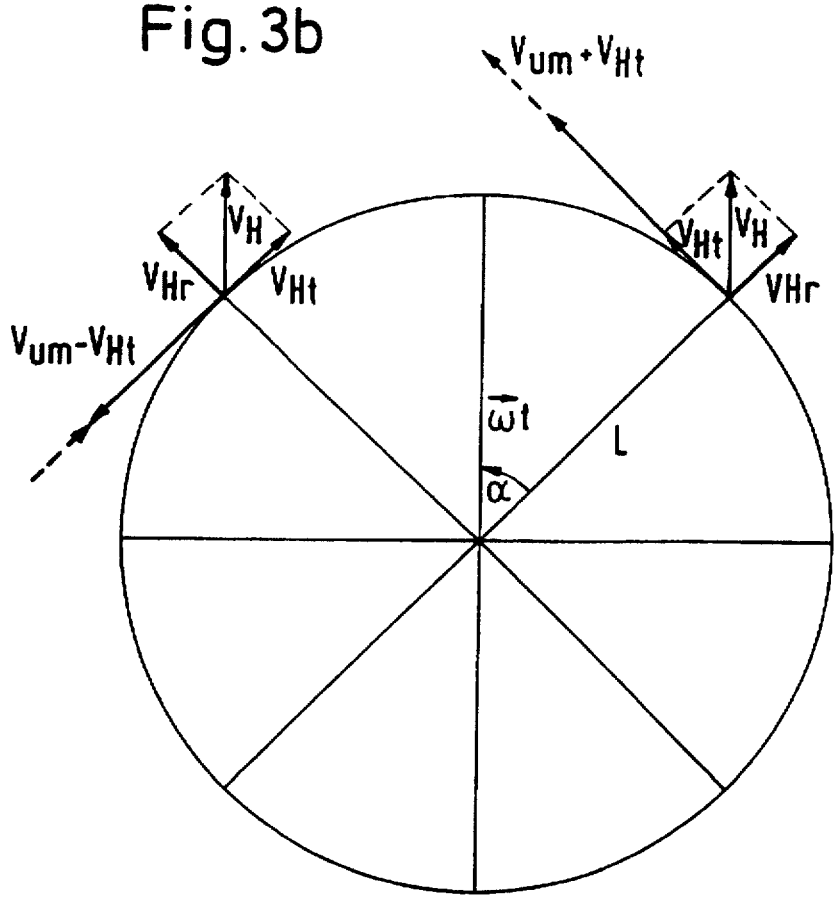
FIG. 3b is a schematic sketch of the vectorial addition of the tangential velocity component of the helicopter to the velocity of the antenna.

The velocity component orthogonal to the direction of view has a totally different effect, as is illustrated in FIG. 3b. This velocity component very decisively affects the design of the synthetic aperture and consequently also the correlation algorithm. If the geometry is assumed not to have changed substantially during a synthetic aperture, the change in the Doppler frequency per unit of time for an individual pin-point target still depends on the angle of rotation. The following equation is obtained for the Doppler frequency of a pin-point target:

$$f_D = 2/\lambda \cdot (v_A \pm v_H \cdot \sin(\omega_0 \cdot t)).$$

This dependence on the angle of rotation is due to the fact that the pin-point targets on the earth's surface move toward the antenna—relative to the tangential component—on one side of the flight path (which is why there is a + sign in the above equation), and they move away from it on the other sign (minus sign). There is, of course, a continuous transition from one side to the other.

Another effect is the increase in the instantaneous Doppler bandwidth on one side of the flight side and its reduction on the other side. Since the antenna has an aperture angle of λ=45° in this exemplary embodiment and the build-up of the synthetic aperture is begun beginning from an angle of rotation of $\omega_0 \cdot t = 45°$, this effect is rather noticeable, and the following equation is obtained for it:

$$B'_D = 2v_H/[\sin(\omega_0 \cdot t + \lambda/2) - \sin(\omega_0 \cdot t - \lambda/2)] =$$

$$2 \cdot v_H/\lambda \cdot (0.9239 - 0.3827) = 2 \cdot v_H/\lambda \cdot 0.5412 = 9,754.6 \text{ Hz}.$$

Even though part of the scanned information is not used at all (because it is outside the image field), this part must nevertheless be scanned, because if this real instantaneous Doppler bandwidth is not scanned correctly, spectral folding problems arise, which greatly deteriorate the theoretical resolution of the ROSAR. If the antenna looks forward, the Doppler bandwidth increases by only 1,372 Hz. Since the pulse repetition frequency $f_p$ must depend on the highest Doppler bandwidth, the normal pulse repetition frequency thus increases in proportion (if desired, also in a velocity-proportional manner) to at least $f_p = 23,550.4$ Hz.

The additional Doppler bandwidth is affected by the depression angle of 10° or 15° only in the form of a reduction by about 3%. The maximum Doppler bandwidth or minimum pulse repetition frequency thus will be $f_r = 23,205.3$ Hz. If the pulse repetition frequency is set at 24 kHz, an "Oversample Ratio" of only 1.034 is obtained. This is very meager from the viewpoint of information theory.

Thus, the synthetic aperture has 471 support points, and the earth's surface is illuminated by an antenna by 2×471= 942 pulses.

The deviation from the circle must be corrected downward to $\lambda/8$, i.e., to 0.0008333m. This again means that the forward velocity must be measured to an accuracy of $\lambda/8$ within the integration time. The absolute measuring accuracy arising from this is 0.0425m/sec or 0.153 km/hr. At a forward velocity of 50 knots, this corresponds to 0.165%. However, the absolute measuring accuracy rather than the relative measuring accuracy in percentage is decisive here, because the deviation must be measured at an accuracy to $\lambda/8$ even at a low forward velocity. Since the standard navigation equipment, such as GPS ( Global Positioning Satellite ), INS ( Inertial Navigation System ), etc., cannot accomplish this required measuring accuracy, but an accuracy that is lower by a factor of 2 to 3 (about 0.4 km/hr.), the measuring accuracy must be increased by additional measurement methods.

The forward velocity can be determined from the Doppler shift of a nonmodulated CW ( Continuous Wave ) transmitted signal. The transmitted signal of the ROSAR, is used for this, but the standard FM modulation is to be switched off, and it is necessary to take at least as many pulses (about 50-100) as are needed for the "Doppler Beam Sharping."

Figure 4:
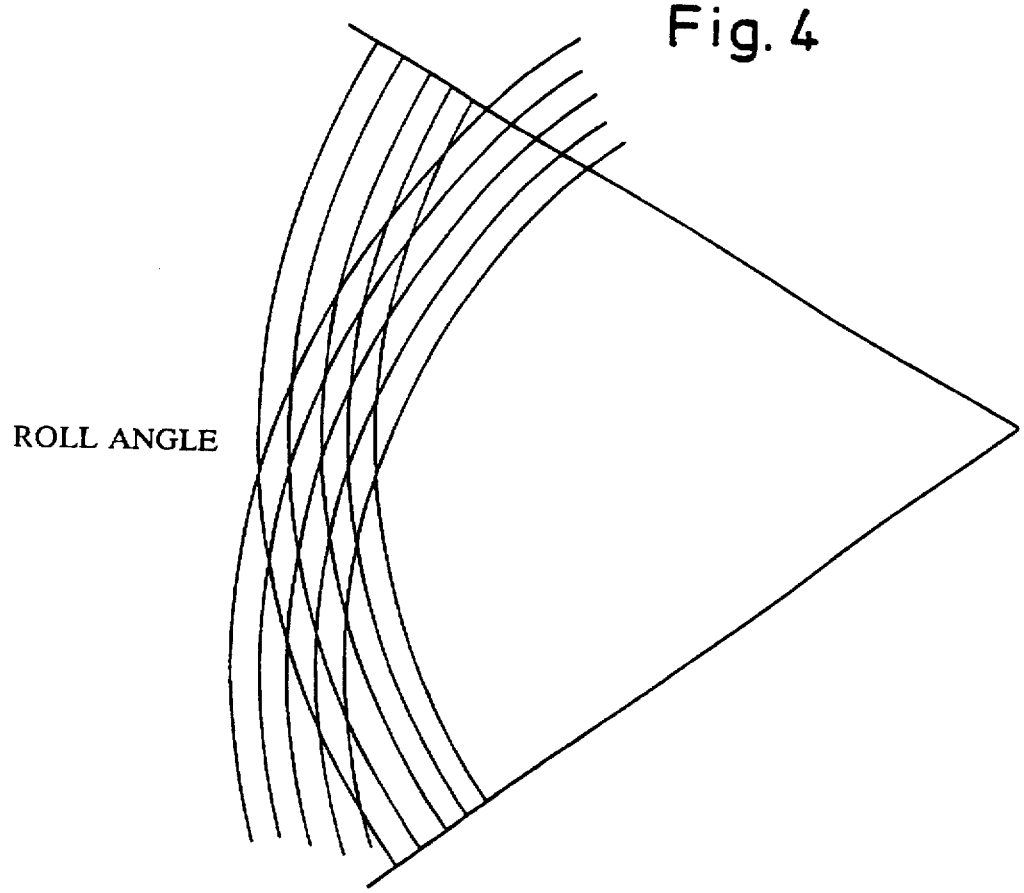
FIG. 4 is a schematic sketch of the shift of the light spot of the antenna on the earth's surface through the helicopter roll angle.

Furthermore, the effects caused by the rolling and pitching motions must be corrected. The rolling motion of the helicopter causes an oblique position of the antenna turnstile plane. However, this entails a deterioration of the antenna light spot on the earth's surface, as is illustrated in FIG. 4. The previously concentric circular rings are now distorted such that, e.g., the illuminated strip to the right of the helicopter is pulled toward the helicopter, and that located to the left is pushed away. If this undesired motion is not corrected, the strip illuminated by the antenna runs out of the reception time gate.

If an antenna has an aperture angle of, e.g., 2.5°, and the roll angle is also 2.5°, a large part of the strip to be imaged at the margin of the image falls into the antenna gain minimum. However, after processing this generates an image with large, black strips toward the margin of the image. Larger roll angles further increase the black strips. To remedy this situation, the reception gate must be set forward or backward in the receiver from one pulse to the next.

This can be done digitally, e.g., after the pulse compression. However, since only range scanned values in the azimuth that are constant over time are used for processing a circle segment, this means that the data needed from different antennas must be "pieced together" by interpolation, depending on the roll angle. However, the prerequisite for such a concept is that in the case of distributed transmitters and receivers, these be connected to one another coherently and have the same transmission frequency.

Figure 5:
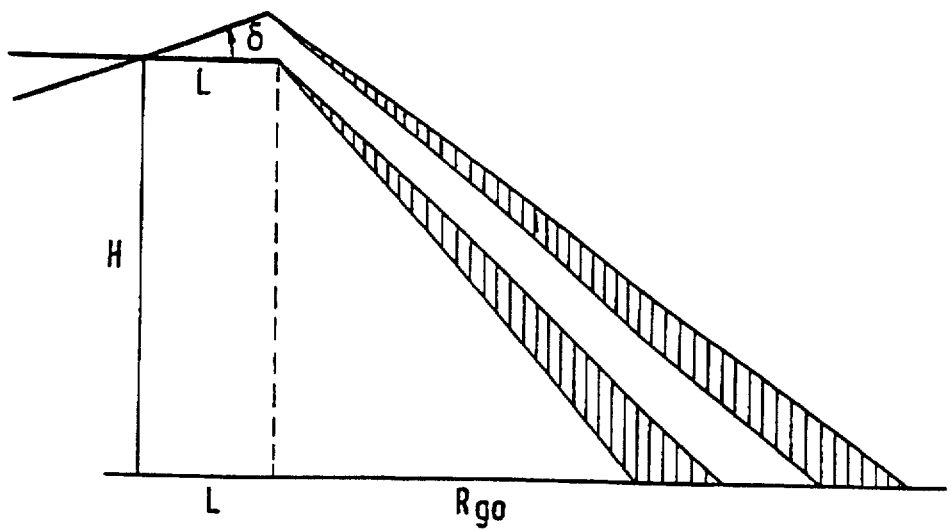
FIG. 5 is a schematic sketch of the shift of the light spot of the antenna on the earth's surface through the pitch angle of the helicopter.
Figure 6:
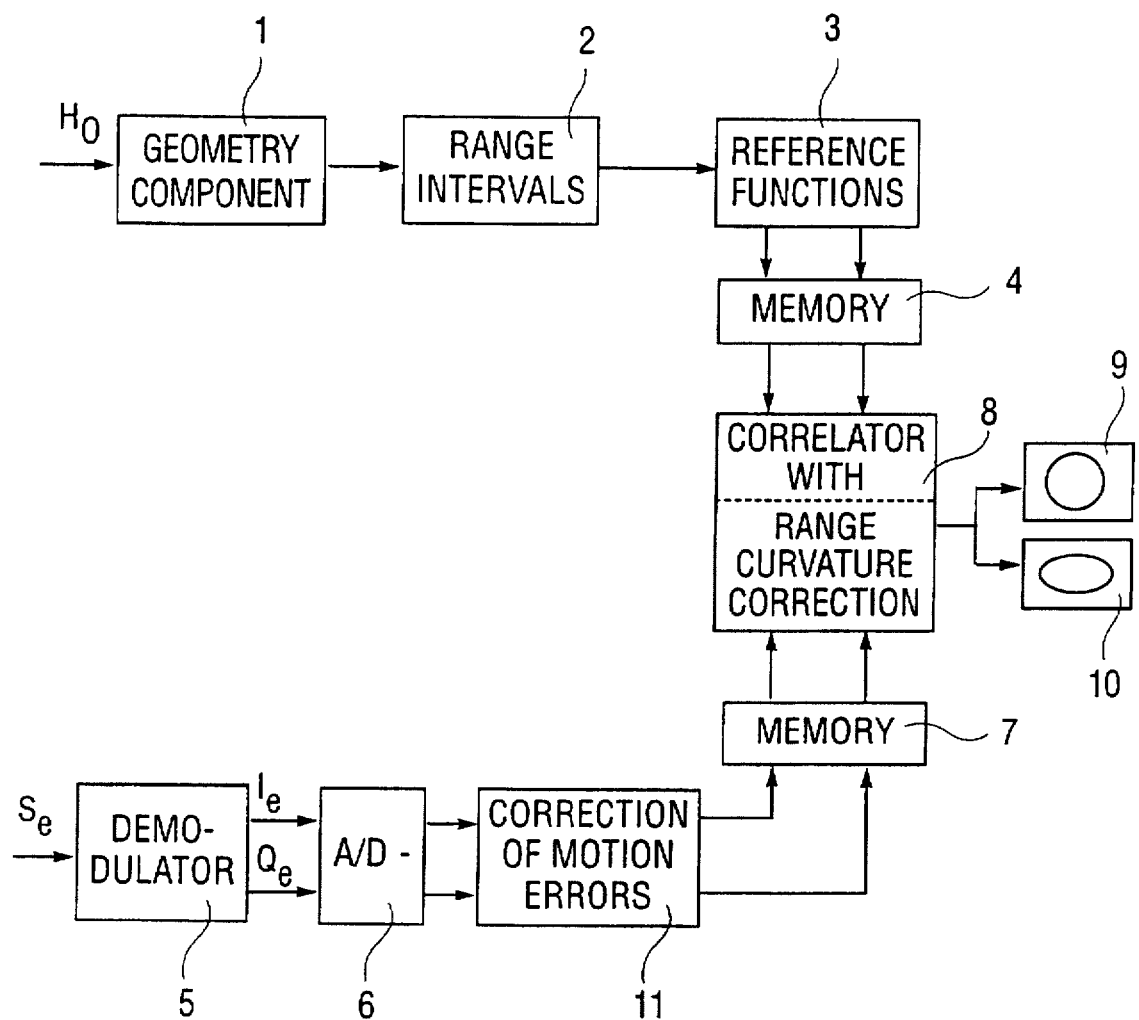
FIG. 6 is a schematic representation of a block diagram of the prior art.

Regarding the pitching motions of the helicopter, these motions are the least critical compared with the other disturbances. As is illustrated in FIG. 5, these pitching motions only shift the area illuminated by the antenna in the forward or rearward direction, uniformly over the entire image surface. To compensate the effect, the reception gate in the receiver is correspondingly set forward or backward. However, this does not normally entail any changes in the processor if the reference function is the same for all ranges.

The effects of the vibrations of the antenna turnstile, which can be divided into three components, shall now be examined as well:

a) in the direction of rotation of the antennas, b) at right angles to the direction of rotation of the antennas upward and downward, and c) at right angles to the direction of rotation of the antennas in the outward and inward directions, i.e., in the direction of the centrifugal force.

Ad a: The vibrations of the antennas in the direction of rotation are so-called longitudinal vibrations. The geometric distance changes here from one scanned value to the next at scanning intervals that are constant over time.

Ad b: The vibrations at right angles to the direction of rotation of the antennas in the upward and downward directions have the same effects, depending on frequency, as the rolling or pitching motions. Low-frequency vibrations below 51 Hz behave like pitching motions, whereas higher-frequency vibrations behave like rolling motions. As was described, the same problems occur as well, and they must be compensated according to the same methods. Vibrations above 51 Hz with a deflection greater than 0.1°, corresponding to ±2.6 mm at the end of the antenna arms, must be measured and corrected.

Ad c: The distance from the light spot to be imaged on the earth's surface changes continuously during these vibrations.

The vibration components according to a and c cause phase errors in the classical sense. Deflections by more than 0.8 mm must now be corrected. They are measured with an "acceleration triad," which is rigidly arranged at the end of the antenna cross. The analog output signals obtained are digitized by A/D converters and are further processed in the corresponding algorithms.

Furthermore, the changes in the frequency of rotation are to be investigated. Two effects can be observed in the case of an uncorrected change in the desired frequency of rotation: There is a change in the length of the reference function, and a change in the slope of the Doppler curve, caused by the change in the frequency of rotation, is much more critical. In the first case, i.e., the change in the length of the reference function, the effect can be ignored, because the improvement or deterioration caused by it in resolution is in the range of only ±2%. In contrast, a change in the frequency of rotation by, e.g., 1% causes a phase error of about $\lambda/3$, and a change in the frequency of rotation of 2.9% means a phase error of $\lambda$. Phase errors of $\lambda/8$ or greater, corresponding to a change in the frequency of rotation by about 0.4%, are therefore to be measured and corrected.

As was explained above, the crude ROSAR data are consequently subject to different effects, which cause a shift of the A/D converter data three-dimensionally in space and must therefore be canceled or eliminated before the correlation. Various methods may be used.

One method is the frequency shift method, another is the multiplication method with the phase factor, and a third is the interpolation method. Another embodiment would be the autofocus method, but it involves the principal problem that the continuously variable Doppler bandwidths prevent an optimal (theoretical) azimuthal resolution in the image before the correction is performed.

The prior-art ROSAR processor is to be expanded, corresponding to the correction method selected, by two electronic correction components for the two orthogonal directions, namely, for the range, i.e., in the direction of view of the antennas, and for the azimuth, i.e., in the direction of rotation of the antennas. Depending on the type of the processor, a shift caused in the time range is performed when a standard correlation is used, and if this shift over the entire strip corresponds to a constant value, a multiplication is performed in the frequency range by a phase factor, corresponding to a shift by fractions of the wavelength $\lambda$. If the data are in the frequency range, the multiplication takes place after the first FFT ( Fast Fourier Transform ). This is normally possible at antenna aperture angles less than about 10°.

As regards the correlation, a correlation function is shifted over the data in the case of a correlation in the time range. The investigations revealed that the actual performance can be determined by testing only, and the amount of computer hardware needed for this is so large that it cannot be accommodated in a helicopter.

The correlation in the frequency range reduces the number of operations, and about 32 DSPs ( Digital Signal Processor ) are needed for the processing algorithm in the azimuth. If, e.g., the Sharp DSP LH 9124 is used to carry out the algorithms, 16 DSPs are needed for the FFTs in the azimuthal direction alone. If an equal number of DSPs is taken once again for multiplications, interpolations, etc., and as a safety factor, about 32DSPs are needed for the processing algorithm in the azimuth. Including high-speed memories and infrastructure, these can be accommodated on about 16 double Europe cards.

In spectral analysis, the so-called SPECAN method, the raw data are multiplied by an extended version of the transmitted signal and subsequently subjected to a spectral analysis. A considerable amount of calculation operations can be saved here in the case of the conventional SAR ( Synthetic Aperture Radar ) but the losses of resolution toward the margin of the image, amounting to 10% to 20%, and an equally great deterioration of the signal-to-noise ratio have caused this SPECAN method to be no longer used in conventional SAR, because hardware is so fast now that the time savings are disproportionate to the degradation of the image. However, the situation changes fundamentally for the ROSAR because of the extremely variable geometry involved here. The SPECAN method is frequently repeated in small increments, and an adaptation to the variable geometry is thus achieved.

Two methods may be considered for use to eliminate conditions which are caused by the forward motion of the helicopter: One is the two-dimensional interpolation, by which the variation in geometry is reduced to the extent that the residual errors no longer greatly affect the image quality greatly. Interpolation by means of cubic folding has proved to be the best solution here for the interpolation in the SAR image processing.

In the other method, the one-dimensional interpolation can be performed in the direction of the distance, and the SPECAN algorithm with variable pitch of the Doppler signal is used in the azimuthal direction.

To carry out the measures shown above and to solve the task set, the basic structure of the ROSAR processor is expanded, as is illustrated in FIG. 1, and the data in the range are compressed by means of "Deramp-on-Receive," and the analog/digital-converted data are transformed by means of an FFT for pulse compression.

A spectrum in which the tone pitch is proportional to the range is obtained as a result. Each spectral coefficient represents a resolution cell in the range, and the amplitude is proportional to the reflected power of the transmitted signal.

In the next processing step, a shift in the time gate is performed by a simple index shift, and this shift cancels a shift of the illuminated spot on the earth's surface, which is caused by a pitching or roll angle of the helicopter. Since the index shift results in only an approximate shift in the grid of the scanned values, a finer shift must be performed by interpolation. Any desired fine shift of the data, which, though requiring a large amount of calculation time, must be performed for a fraction of the data only, can be performed by means of this interpolation.

To compensate the variations in amplitude caused by the vibrations of the turnstile, a scaler multiplication is performed after the interpolation. To process the Heli-SAR data in the azimuthal direction, the data must be rotated by means of a large memory or a "Corner Turn" algorithm. The columns of a data matrix now become lines, and the lines become columns. This means that the data matrix has been rotated by 90°.

A second interpolation, which eliminates the shift of the data due to the tangential velocity component, is performed after the "Corner Turn." The vibrations of the antenna turnstile in the direction of rotation may now be included as well.

The motion compensation is thus concluded. It is followed by the fast correlation in the azimuth (FFT, multiplication by the reference spectrum, inverse FFT) only. Another two-dimensional interpolation and the conversion of the complex data into real amplitude data are then performed as the last process steps. The last interpolation is necessary for adequately scanning the increase in bandwidth generated during the conversion of the complex data.

FIG. 1 shows a device for performing the above operation. The helicopter contains transmitting and receiving antennas on the edge of a rotating arm which can be helicopter rotor or a turn style above the rotor. The transmitting antenna transmits successive pulses and the receiving antenna receives the pulses once they have been reflected from distance objects and return back to the helicopter. The receiving antenna receives these reflected pulses and a demodulator 15 demodulates the pulses. An A to D converter then digitizes the demodulated pulses. Pulse compression means 30 compresses these pulses and transforms them by means of an FFT. The data in the pulse compression means can also be compressed by a "Deramp-on-Receive". After the pulse compression means, data is the transferred to an index shifting means 31 and the helicopter pitch angle is also received. The index shifting means then shifts the time gate of the data received from the pulse compression means. A first interpolation means 32 receives data from the index shifting means 31, receives data concerning the rotor precession and optionally receives data concerning range walk. The first interpolation means 32 cooperates with the index shifting means for fine shifting of the time gate. After the first interpolation means 32, data is sent to a scaler multiplication means 33 which also receives turn style pitch angle. The scaler multiplication means 33 compensates for variations in amplitude. The data is then sent to a corner turn means 32 which can also be a very large memory circuit. From there the data is sent to a second interpolation means 35 which also receives the variable distance of the scanned values. A correlator with range curvature correction receives data from the second interpolation means and also receives data concerning reference functions 13. The correlator 18 then sends the data to a third interpolation means 36. The second interpellation means, the correlation means and the third interpolation means compensates for a data shift caused by tangential velocity components. From the third interpolation means 36 data is sent to a detection means 37 which receives complex data from the third interpolation means and converts the complex data into real amplitude data. The data is the sent to a memory 20 and a monitor 19. The reference functions 13 receives data concerning the frequency of rotation and also data from a range interval means 12. The range interval means 12 correspondingly receives data from a geometry component 11.

While specific embodiments of the invention have been shown and described in detail to illustrate the application of the principles of the invention, it will be understood that the invention may be embodied otherwise without departing from such principles.

What is claimed is:

1. A device for motion error compensation of a synthetic aperture radar based on a rotating antenna of a helicopter and flight guidance, the device comprising:

transmitting and receiving antennas arranged on a rotating arm for transmitting successive transmitted pulses and for receiving reflected said transmitted pulses as received signals;

correlation means for correlating said received signals with preset reference functions;

correction means for correcting motion and curvature errors;

demodulation means for demodulating raw data;

A/D converter for digitizing data from said demodulation means;

a pulse compression means for pulse compression of data from said A/D, said pulse compression means transforming data by means of an FFT;

index shifting means for receiving data from said pulse compression means and for shifting a time gate of the data received from said pulse compression means;

first interpolation means for receiving data from said index shifting means and cooperating with said index shifting means for fine shifting of said time gate;

scaler multiplication means for receiving data from said interpolation means and for compensating variations in amplitude;

memory means for receiving and storing data from said scaler multiplication means;

second interpolation means for receiving data from said Corner Turn means;

said correlation means receiving data from said second interpolation means;

third interpolation means for receiving data from said correlation means, said second interpolation means, said correlation means and said third interpolation means compensating for a data shift caused by a tangential velocity component;

detection means for receiving complex data from said third interpolation means and for converting said complex data into real amplitude data;

a memory and a monitor for receiving data from said third interpolation component.

2. Device in accordance with claim 1, wherein:

said data in said pulse compression means is compressed by a "Deramp-on-Receive."

3. Device in accordance with claim 1, wherein:

interpolation of SAR image processing is performed by cubic convolution or other means for two-dimensional interpolation.

4. Device in accordance with claim 1, wherein:

one-dimensional interpolation is performed in a range direction, and a SPECAN algorithm with variable pitch of a Doppler signal is used in an azimuthal direction.

5. Device in accordance with claim 1, wherein:

an "acceleration triad" is rigidly arranged at an end of an antenna turnstile measures phase errors caused by a vibration component.

6. Device in accordance with claim 2, wherein:

interpolation of SAR image processing is performed by cubic convolution or other means for two-dimensional interpolation.

7. Device in accordance with claim 2, wherein:

one-dimensional interpolation is performed in a range direction, and a SPECAN algorithm with variable pitch of a Doppler signal is used in an azimuthal direction.

8. Device in accordance with claim 2, wherein:

an "acceleration triad" is rigidly arranged at an end of an antenna turnstile measures phase errors caused by a vibration component.

9. Device in accordance with claim 1, further comprising:

means for forming range intervals.

* * * * *